United States Patent [19]
Phillips, Jr.

[11] 4,159,079
[45] Jun. 26, 1979

[54] DISPENSER

[75] Inventor: Stanley J. Phillips, Jr., Sandy Hook, Conn.

[73] Assignee: Sealed Air Corporation, Saddle Brook, N.J.

[21] Appl. No.: 827,141

[22] Filed: Aug. 24, 1977

[51] Int. Cl.² .............................................. B05B 15/02
[52] U.S. Cl. ................................... 239/112; 239/118; 239/528
[58] Field of Search ........................ 239/112, 116–118, 239/414, 415, 417.5, 527, 528, 600

[56] References Cited

U.S. PATENT DOCUMENTS

| | | |
|---|---|---|
| 3,687,370 | 8/1972 | Sperry ................................. 239/112 |
| 3,786,990 | 1/1974 | Hagfors ............................... 239/112 |
| 4,023,733 | 5/1977 | Sperry ................................. 239/112 |

*Primary Examiner*—John J. Love
*Attorney, Agent, or Firm*—Lerner, David, Littenberg & Samuel

[57] ABSTRACT

Apparatus for mixing and dispensing at least two liquids, such as organic resins and polyisocyanates which react to form polyurethane foam, having a cylindrical mixing chamber positioned in the front end of a dispensing gun. The mixing chamber has exterior longitudinal gaskets intermediate its inlet ports so that the two liquids cannot migrate around the outside of the cylindrical mixing chamber. These gaskets extend into, and are held by, small passages in the annular shoulder on the interior facing end of the mixing chamber.

6 Claims, 7 Drawing Figures

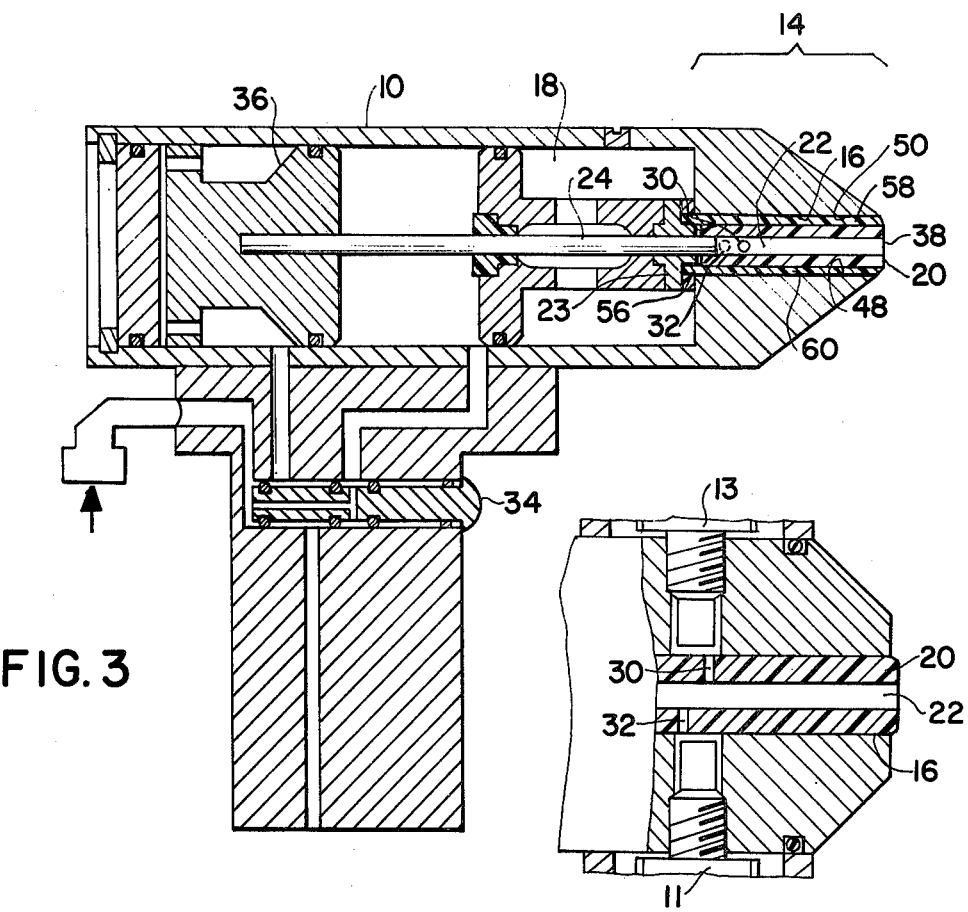
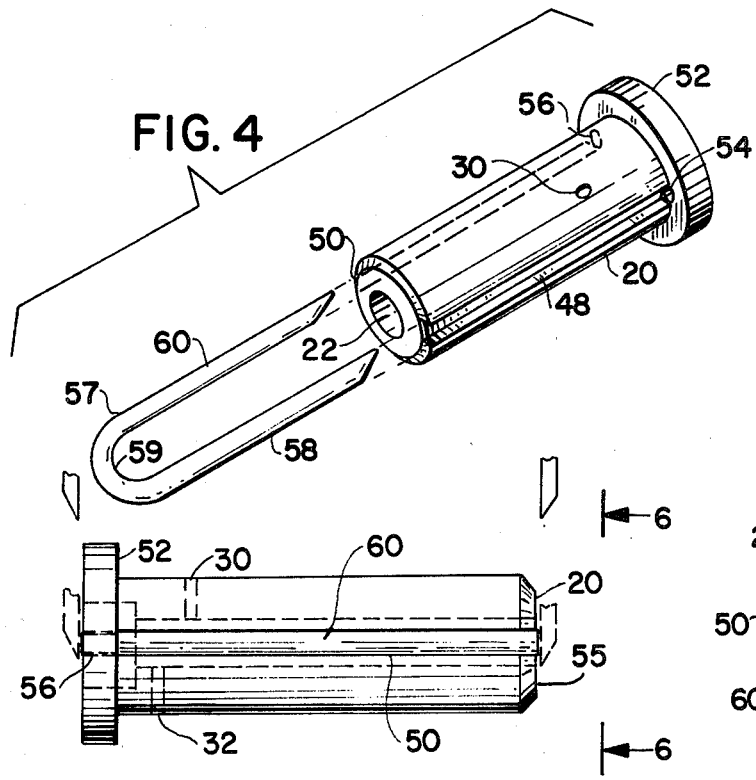

DISPENSER

BACKGROUND OF THE INVENTION

This invention relates to apparatus for mixing and dispensing a plurality of fluids, especially liquids which react with each other. It is particularly useful as a device for mixing and dispensing polyurethane foam reactants.

There is substantial need for apparatus to produce a uniform homogeneous mixture of a plurality of liquids. In particular, the preparation of polyurethane foams requires the uniform mixing of liquid organic resins with polyisocyanates and the like which react relatively rapidly to form foam. Any mixing of the reactants within the dispensing gun but outside the mixing chamber thereof is most undesirable. Serious problems occur when mixing and reaction take place within the gun but outside of the mixing chamber. The mixture, upon foaming, increases in volume to such an extent that not only are passages within the gun blocked, but also ancillary feed hoses leading to the gun can also be blocked. Thus, not only is the dispensing gun disabled, but hoses leading to the gun often require replacement. This leads to excessive down-time of the gun and economic waste.

In the present invention, as will be evident as this description proceeds, the foregoing problems are substantially alleviated.

U.S. Pat. No. 3,687,370, "Liquid Mixing and Dispensing Apparatus", issued Aug. 29, 1972, and U.S. Pat. No. 4,023,733 "Foam Dispensing Apparatus" issued May 17, 1977, owned by the assignee hereof, disclose a gun-type apparatus for mixing and dispensing a plurality of liquids which is particularly suitable for use with polyurethane foams. The separate liquids are fed under pressure into ports in the forward section of the gun and said ports in turn feed the reactants into a central mixing chamber. Flow into the mixing chamber is controlled by a valving rod. In the past undesired flow around the exterior of the mixing chamber was restrained by inserting the nylon or Teflon mixing chamber into the slightly smaller diameter bore of the metal gun creating a press fit seal. It has been found that such press fit seal is sometimes inadequate to restrain flow of liquids under relatively high pressure and at intermittant flow. With migration, as noted above, the fluids can mix in the passages of the forward section of the gun or around the mixing chamber thereby disabling the gun and requiring replacement of the hoses.

The present invention represents an improvement over the teachings and disclosures of U.S. Pat. No. 3,687,370 and U.S. Pat. No. 4,023,733 as will be apparent from this description. The basic operation and structure of this dispenser is substantially the same as the device described in said patent, and accordingly the disclosure thereof is incorporated by reference herein.

SUMMARY OF THE INVENTION

A mixing and dispensing apparatus is provided with a mixing chamber having a novel arrangement of gaskets to prevent liquids from migrating around the exterior from one port to another. Said mixing chamber is cylindrical with an annular shoulder at one end, press fitting inside the bore of the front section of the gun with the shoulder abutting the interior end of said bore. Radially oriented ports on opposite sides of the chamber direct liquids to a central concentric chamber for mixing and dispensing. On the outside of the cylinder and for the entire length thereof are shallow longitudinal slots with gaskets. These gaskets extend through smaller holes in the annular shoulder, thus eliminating any gap and providing a means for holding the gasket in place. This mixing chamber construction substantially improves the reliability and useful life of the mixing device.

BRIEF DESCRIPTION OF THE DRAWINGS

FIG. 2A is a fragmentary enlarged sectional view, taken on line 2—2 of FIG. 1.

FIG. 3 is a cross-section view showing the inner mechanism of the present apparatus in the open position;

FIG. 4 is a partially exploded, perspective view of the present mixing chamber and component gasket assembly;

FIG. 5 is an elevation view of the mixing chamber and gasket assembly after insertion and clipping of the gasket assembly;

FIG. 6 is an end view of the mixing chamber and gasket assembly of FIG. 5 with portions broken away.

DESCRIPTION OF THE INVENTION

Figure 1:
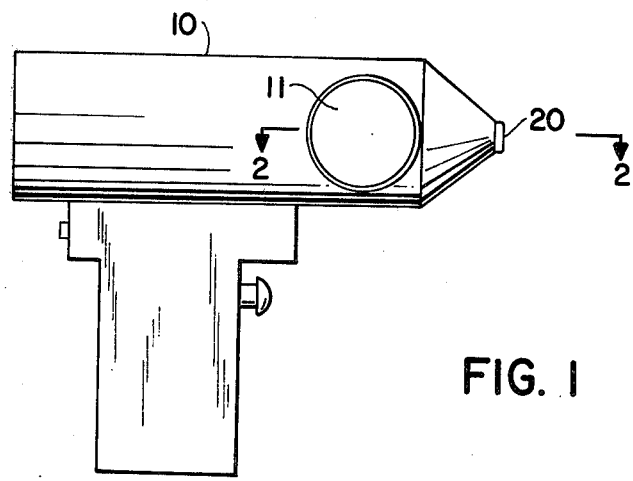
FIG. 1 is an exterior side view of the present mixing gun.
Figure 2:
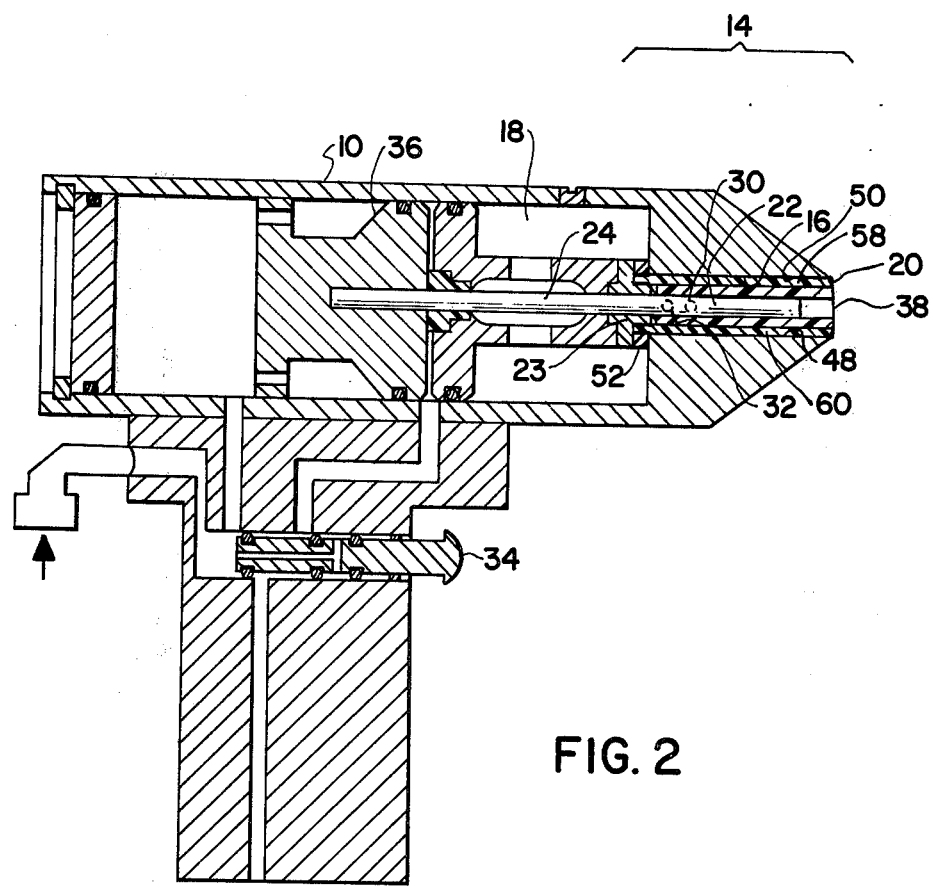
FIG. 2 is a cross-sectional view showing the inner mechanism of the present apparatus in the closed position.

Turning now to FIGS. 1, 2, 2A and 3, the dispensing gun 10 is shown with a pair of inlet terminals 11 and 13 which supply liquids for mixing and dispensing in the mixing chamber 20. FIGS. 2 and 2A show a cross-sectional view thereof with a frontal portion 14 wherein the bore 16 holds the mixing chamber 20. Said mixing chamber has a pair of non-aligned radial ports 30 and 32 leading from the respective inlet hoses to the central concentric chamber 22. A valving rod 24 in the position of FIG. 2 within the chamber 22 blocks the interior orifices of the ports 30 and 32 thereby controlling the flow of liquids. When the trigger 34 is pressed inwardly the piston 36 is pneumatically (preferably) moved rearward and the valving rod 24 is retracted from the chamber to a position rearward of the ports (FIG. 3) and liquids flow under pressure through ports 30 and 32 into the chamber 22 for mixing and are emitted from the orifice 38 thereof to rapidly form polyurethane foam. As FIG. 3 shows, in this retracted position the valving rod 24 is substantially bathed in a cleaning solution and/or lubricating solvent contained in the solvent chamber 18. Upon releasing the trigger, the piston 36 is pneumatically moved forward and the valving rod 24 traverses the entire length of the chamber 22, cleaning and lubricating as it closes the gun and being itself scraped by washer-bushing 23.

In both the open and particularly the closed condition, the pressurized liquids in ports 30 and 32 and their respective hoses must be kept separate. The mixing chamber 20 herein is designed such that the liquids cannot migrate around the outside of the chamber inside of the bore 16.

FIG. 4 shows that the outside of the mixing chamber 20 has diametrically opposite grooves 48 and 50 along the entire length of the cylindrical portion thereof and midway between the orifices of ports 30 and 32. Small circular passages 54 and 56 through the annular shoulder 52 form a continuation of said grooves.

Gasket 57 is formed of a slender rod of neoprene or similar gasketing material. It is slantwise cut at both ends and is pulled through passages 54 and 56 as shown. Said passages are of slightly smaller diameter than gasket 57, and upon pulling the protruding ends thereof, the gasket stretches, decreasing in cross-section to pass through the passages. Thus the gasket is formed such that sides 58 and 60 lie in grooves 48 and 50, respectively, with the loop 59 nearly abutting the end 55 of the mixing chamber as shown in FIG. 4.

In assembling the gun 10, the mixing chamber 20 as shown in FIG. 4 is press fitted into the cylindrical bore 16 which causes the gasket 57 to be stretched. After such assembly, the assembler pulls on loop 59 to return the gasket to its relaxed position. Then, the ends of the gasket are severed flush with the external end of the annular shoulder 52 and the gasket seals the passages 54 and 56. The loop 59 is also severed as shown flush with end face 55.

FIG. 6 illustrates an end view of the gasket 58 protruding beyond the radius of the cylindrical portion of the mixing chamber 20. Preferably, standard 0.093 inch gasket material in a 0.059 inch deep groove of 0.093 inch width is utilized with a 0.086 diameter passages through the annular shoulder. This insures no leakage path along or around the gasket and groove.

This mixing chamber and gasket assembly is press fitted into the bore 16 of the frontal section 14 of the gun 10 such that the annular shoulder 52 abuts end of said bore as FIGS. 2 and 3 show. The gasket loop 59 retains the gasket during installation and is subsequently severed flush with the front end 55 of the gun and mixing chamber and discarded.

The longitudinal gaskets prevent migration of pressurized foam reactants around the exterior of the mixing chamber 20 inside the bore 16. No gap in gasketing exists at the interior shouldered end of the mixing chamber, and the opposing end thereof is outside of the gun.

It is appreciated that numerous changes and modifications can be made to the embodiment described herein without departing from the spirit and scope of the invention.

What is claimed:

1. A dispensing gun for mixing and dispensing a plurality of reactable fluids comprising
    a housing,
    a cylindrical mixing chamber fitted into a cylindrical bore in said housing,
    at least two inlet means on said housing and communicating with said bore for feeding reactable fluids to said mixing chamber,
    said cylindrical mixing chamber having a cylindrical outer surface and an axial bore forming an axial chamber for mixing fluids, said cylindrical mixing chamber further having radial inlet ports interconnecting said axial chamber with said housing inlet means, a movable rod axially movable within said axial chamber for controlling flow from said radial inlet ports to said axial chamber,
    said cylindrical mixing chamber further having parallel axially extending grooves formed in the cylindrical outer surface intermediate to said radial ports, and longitudinally extending gaskets mounted in said parallel grooves.

2. The dispensing gun of claim 1 wherein said mixing chamber includes an annular shoulder for positioning said chamber in said housing, said shoulder containing passages forming a continuation of said parallel axially extending grooves, said gaskets extending through said passages.

3. The dispensing gun of claim 2 wherein said passages are smaller in cross-section than said gaskets whereby said gaskets are held in place in said passages.

4. The dispensing gun of claim 1 wherein said movable rod traverses a solvent chamber in said housing for cleaning said axial chamber with movement of said movable rod.

5. The dispensing gun of claim 1 wherein the diameter of each of said gaskets is substantially equal to the width of each of said parallel grooves.

6. The dispensing gun of claim 1 wherein said mixing chamber is press fitted into said housing.

* * * * *